United States Patent

Remensperger

[15] 3,638,778
[45] Feb. 1, 1972

[54] APPARATUS FOR SWITCHING OBJECTS BETWEEN TWO PATHS

[72] Inventor: Franz Remensperger, St. Georgen, Black Forest, Germany

[73] Assignee: Fr. Winkler Kg. Spezialfabrik fuer Baeckereimaschinen und Backoefen, Villingen, Black Forest, Germany

[22] Filed: Feb. 13, 1970

[21] Appl. No.: 11,234

[30] Foreign Application Priority Data

Oct. 17, 1969 Germany.........................G 69 40 463

[52] U.S. Cl.........................................................198/31 AC
[51] Int. Cl.........................................................B65g 47/26
[58] Field of Search................198/31 AC; 222/330; 221/252

[56] References Cited

UNITED STATES PATENTS

| 1,735,825 | 1/1929 | Koch | 198/31 AC |
| 2,670,888 | 3/1954 | Avila | 222/330 X |
| 988,051 | 3/1911 | Valarino | 198/31 AC |

FOREIGN PATENTS OR APPLICATIONS

| 715,132 | 9/1954 | Great Britain | 198/31 AC |

Primary Examiner—Joseph Wegbreit
Assistant Examiner—Hadd S. Lane
Attorney—Michael S. Striker

[57] ABSTRACT

Successive pieces of dough are fed to a mechanical distributing switch which is shifted by alternate pieces between two end positions for guiding the pieces alternatingly between two different paths. Dead-center-arresting means including a movable weight, hold the distributing switch in either end position until the same is shifted by the next following piece to and beyond a dead center position and assumes the respective other end position.

9 Claims, 6 Drawing Figures

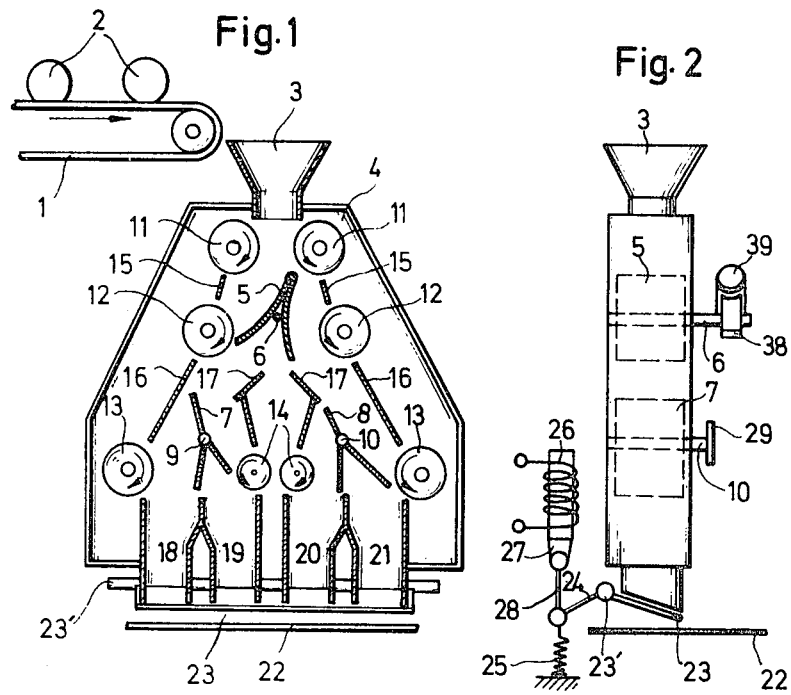
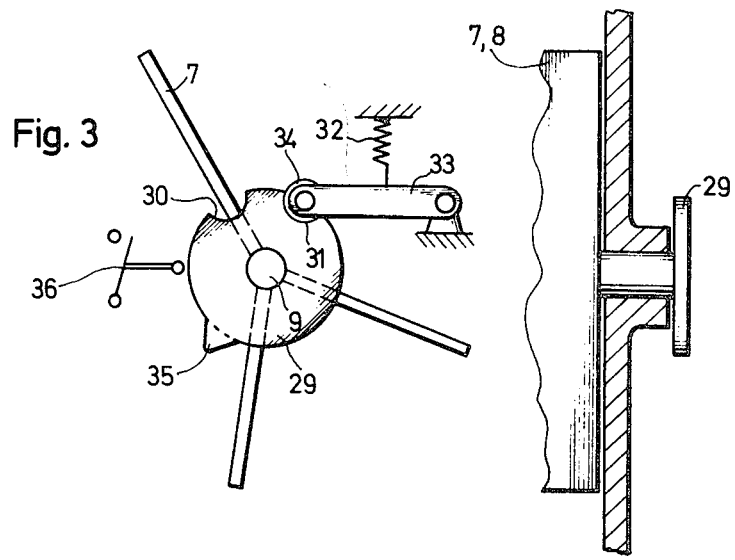

APPARATUS FOR SWITCHING OBJECTS BETWEEN TWO PATHS

BACKGROUND OF THE INVENTION

In accordance with the prior art, pieces of dough are successively fed to a mechanical distributing switch and shift the same alternately between two end positions in which respective pieces are guided to two distributing paths in which other mechanical switches are operated by the pieces of dough to distribute the pieces alternately to two pairs of channels so that, for example, four pieces of dough are delivered in transverse rows in the four channels through which they are deposited on a conveyor.

In an apparatus of the prior art, pieces of dough of different weight may cause disturbances due to the fact that the distributing switches respond differently to pieces of different weight so that the same are not uniformly distributed. To overcome this disadvantage, the prior art provides arresting means including disks connected with the distributing switches for angular movement between the two end portions of the same, and cooperating with resiliently biased rollers engaging recesses in the disks. The disks arrest the distributing switches in either end position, and prevent undesired shifting of the distributing switches.

However, at very high speed of the apparatus, the speed of the pieces of dough causes rebounding of the shifted distributor switches particularly of the first distributing switch since the same is passed by all pieces of dough and must respond within a shorter time than any of the other distributing switches. The pieces of dough supplied to the first distributing switch have to drop through the hopper of the apparatus a comparatively long distance until engaging the first distributing switch, so that the same is operated by a particularly great kinetic energy, and has a tendency to recoil or rebound after the passage of the piece of dough so that the next following piece of dough is guided into the wrong distributing path.

SUMMARY OF THE INVENTION

It is one object of the present invention to overcome this disadvantage of the known art, and to provide an apparatus for switching objects between two paths which reliably operates.

Another object of the invention is to shift a mechanical distributing switch by successive objects between two end positions, and to temporarily arrest the distributing switch by dead-center arresting means which prevent the rebounding of the distributing switch.

With these objects in view, the present invention provides in apparatus for switching objects between two paths, a mechanical distributing switch controlled by dead-center arresting means which hold the distributing switch in either end position thereof so that the next object has to shift the distributing switch only to and beyond the dead center position whereupon the distributing switch assumes the respective other end position.

In an apparatus to which pieces of dough are fed through an inlet hopper to a first distributing switch, and then to a plurality of channels by other distributing switch, at least the first distributing switch is provided with the dead-center arresting means. When a piece of dough drops onto the first distributing switch, it is shifted beyond the dead center position, and then moves to the respective other end position in which it remains and consequently prevents the distributing switch from recoiling.

In a preferred construction of the invention, the dead-center arresting means includes movable weight means which pass through a dead center position. It is advantageous to provide an exchangeable or adjustable weight in order to adapt the apparatus to different weights of the pieces of dough.

In the preferred embodiment of the invention, biassing means include a tubular member with closed ends in which one or several balls are located which can roll between two end positions stopped by the closed ends of the tubular member. This arrangement has the advantage that the closed tubular member does not permit the entry of dust or flour into its interior so that the balls can roll in the same with the smallest possible friction, and reliably obtain arresting of the distributing switch in any end position which it assumes.

In order to adapt the apparatus to the different weights of pieces of dough, the tubular member is removed from its carrier, and another tubular member with differently weighing balls, or with a greater number of balls, is substituted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic front view illustrating an apparatus according to the invention, the front wall being omitted for the sake of clarity;

FIG. 2 is a side elevation of the apparatus shown in FIG. 1;

FIG. 3 is a front view illustrating arresting means;

FIG. 4 is a fragmentary side elevation, partially in section, illustrating the device shown in FIG. 3;

DESCRIPTION OF THE PREFERRED EMBODIMENTS

Figure 5:
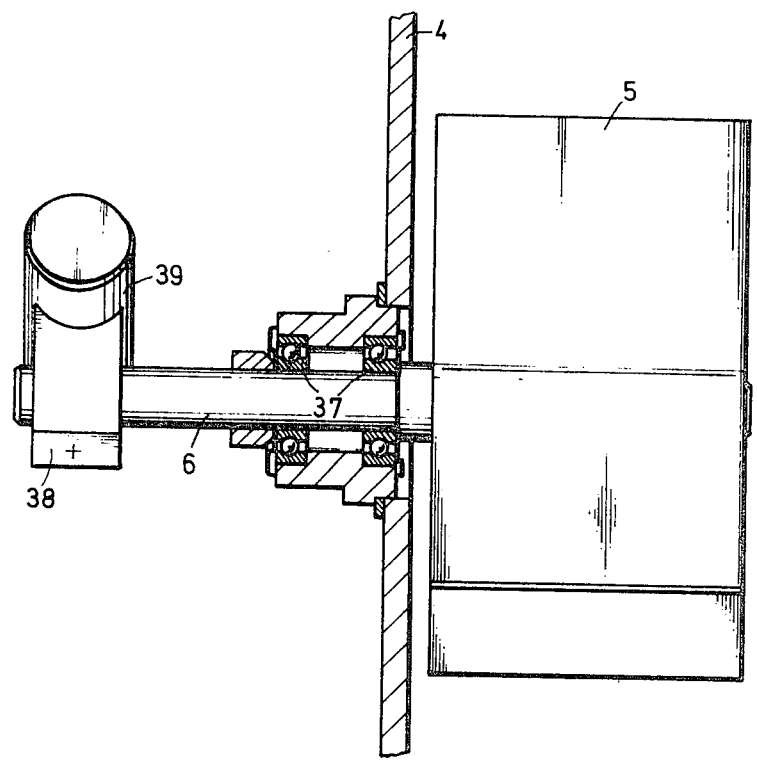
FIG. 5 is a side elevation illustrating a dead-center arresting means in accordance with the invention provided in the apparatus of FIGS. 1 and 2.

As shown in FIG. 1, a conveyor band 1 transports pieces of dough arranged in a single row to the inlet of a hopper 3 which is mounted on top of a housing 4. The pieces 2 drop through the hopper along a feeding path to a mechanical distributing switch 5 which is mounted on a shaft 6 for angular movement with the same between two end positions. Distributing switch 5 has curved walls forming guide faces along which the pieces of dough 2 slide downward. FIG. 1 shows the distributing switch 5 in its right end position, and when a piece of dough falls onto the left guide face of distributing switch 5, the same will be turned in counterclockwise direction to its other end position so that the next following piece of dough will fall on the right guide face of the distributing switch 5 and turn the same back to the illustrated position.

Depending on the position of distributing switch 5, the respective pieces 2 will be alternately guided to move further along two distributing paths in which additional switches 7 and 8 are located. Switches 7 and 8 are respectively secured to shafts 9 and 10 which are mounted in housing 4 for angular movement of switches 7 and 8, and guide faces on switches 7 and 8 are engaged by pieces 2 to shift distributing switches 7 and 8 between two end positions so that the pieces 2, or other objects, can be guided into four channels 18, 19, 20 and 21, as will be explained hereinafter in greater detail.

Adjacent the upper narrow end of distributing switch 5, and adjacent the lower wider end of the same, pairs of transporting rollers 11 and 12 are arranged, respectively, which are driven to rotate in opposite directions, as indicated by arrows to aid the movement of pieces 2. Along the adjacent lower ends of the distributing switches 7 and 8, an inner pair 14 and an outer pair 13 of driven transporting rollers are arranged. Between rollers 11 and 12, a pair of guide sheets 15 is arranged, and between rollers and 12 and 13, a pair of guide sheets 16 is provided. In the center region of the housing 4, angular guide sheets 17 are disposed. The channels 18, 19, 20 and 21 are crossed by a tiltable closure lid 23 to which lever arms 24 are secured, and this structure is mounted on a shaft 23' for angular movement between a position closing the four channels 18 to 21, as shown in FIG. 2, and a position opening the same so that pieces 2 resting in channels 18 to 21 on closure lid 23, can slide downward onto a conveyor band 22 which may move to the right as viewed in FIG. 2 to receive from channels 18 to 21 a transverse row of four pieces of dough 2. A spring 25 is secured to lever arm 24 and to a fixed point on a support, and biases the closure lid 23 to assume the closed position. An electromagnet 26 has a movable armature 27 connected by a link 28 with lever arm 24, so that upon energization of electromagnet 26, closure lid 23 is opened against the action of spring 25, and four pieces of dough 2 are deposited on the conveyor 22.

Shafts 9 and 10 on which the lower distributing switches 7 and 8 are fixed, are mounted in bearings in housing 4, and have projecting end portions on which arresting disks 29 are fixed, respectively.

Disks 29 are part of arresting means for arresting the additional distributing switches 7 and 8 in their respective end positions, and the arresting means is best seen in FIGS. 3 and 4 which show a disk 29 provided with arresting recesses 30 and 31 in its periphery which cooperate with roller 34 on a lever 33 biassed by spring 32. When the respective distributing switch 7 or 8 is shifted, roller 24 is pressed out of recess 31, moves a certain distance along the periphery of the respective disk 29, and then falls into arresting recess 30 to arrest disk 29 and also the respective distributing switch 7 or 8 in its other end position.

Arresting disk 29 which cooperates with distributing switch 8, has a projection 35 cooperating with the actuator arm of a switch 36. Switch 36 is connected with the electromagnet 26, and energizes the same when closed by actuating projection 35.

It has been found that arresting means of the type shown in FIGS. 3 and 4, if provided on shaft 6 of the first distributing switch 5, do not reliably hold distributing switch 5 in one of its two end positions since particularly heavy pieces of dough 2 or other objects, dropping through hopper 3, develop so much kinetic energy that the distributing switch is not only shifted, but bounces back, assuming its initial position.

In accordance with the invention, a dead-center arresting means is provided for holding distributing switch 5 in one or the other of its end position, so that rebounding of the distributing switch 5 is prevented due to the fact that an increasing force is required to move the dead-center arresting means out of either end position.

Figure 6:
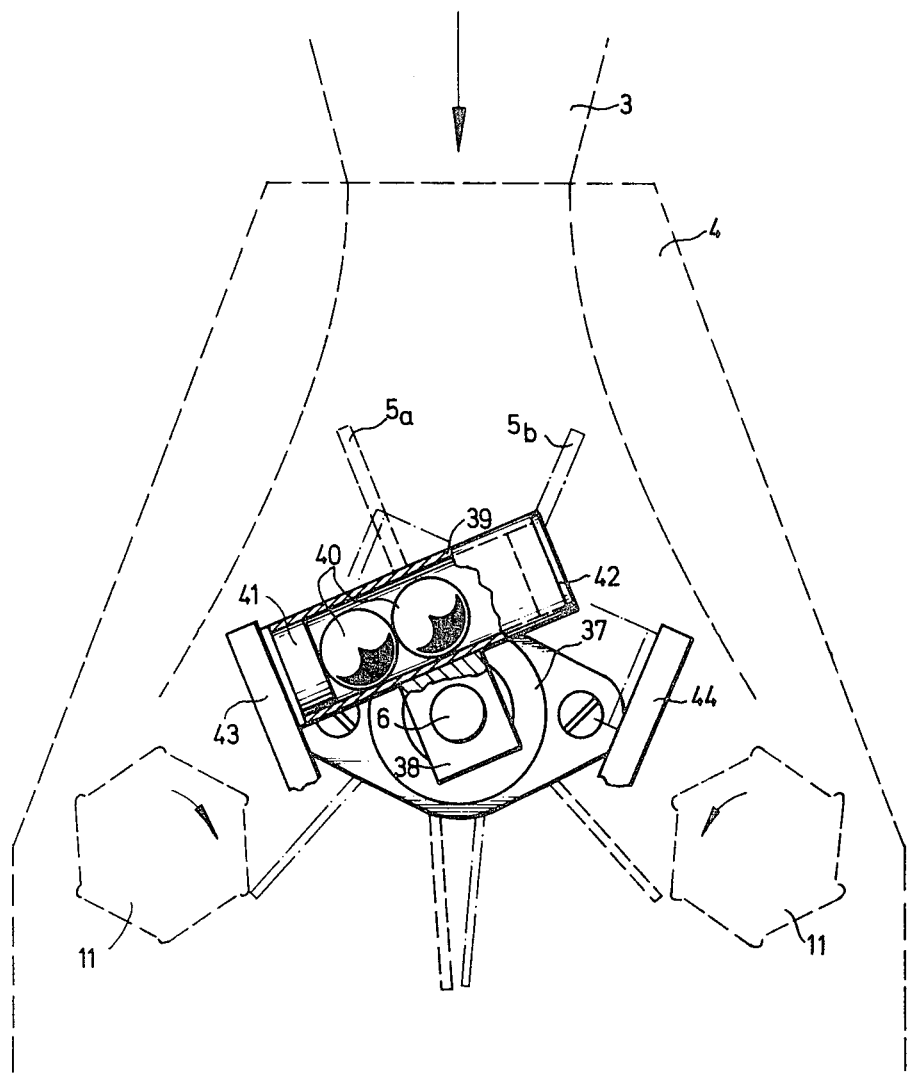
FIG. 6 is a front view of the dead-center arresting means shown in FIG. 5.

As shown in FIGS. 5 and 6, which illustrate a preferred embodiment of the invention, shaft 6 is mounted in a ball bearing 37 on a wall of housing 4 and carries not only the first distributing switch 5, but also a lever formed with a clamping portion 38 which can be adjustably fixed on shaft 6, or removed from the same together with a tubular member 39 which is fixedly secured to the clamping lever 38.

Tubular member 39 is closed by two end plates 41 and 42, and forms an inner cylindrical cavity in which two spherical balls 40 are mounted for free rolling movement. In the end position of distributing switch 5 and arresting means 39, 38, shown in FIG. 6, balls 40 rest on end plate 41 due to the action of gravity, and exert torque on shaft 6 and distributing switch 5 biassing the same to assume and to remain in the position 5a shown in broken lines in FIG. 6.

However, if in this position, a piece or object 2 drops onto the right guide surface of distributing switch 5, as shown at the lower end of the same in FIG. 6, distributing switch 5 will assume the position 5b shown in chain lines, and tubular member 39 will turn to a corresponding position, also shown in chain lines in FIG. 6, so that the balls 40 will abut plate 42 and bias the distributing switch 5 to remain in the other end position 5b. The piece or object 2 acting on a guide face of the distributing switch 5, will have to displace the dead-center arresting means 38, 39, 40, 41, 42 against the torque exerted in counterclockwise direction, as viewed in FIG. 6, by the heavy balls 40. However, when the dead center position is reached, the balls 40 will roll quickly to the other end until abutting end plate 42 for holding distributing switch 5 in the end position 5b. In order to form transverse rows of four pieces 2 on conveyor 22 of the single line of pieces 2 transported by conveyor 1, the apparatus is operated, as follows:

The pieces 2 are transported by conveyor 1 into the hopper 3 and drop freely along a feeding path which leads to the distributing switch 5 which is assumed to be in the position as shown in FIG. 1. Movement and guidance of the pieces is assured and improved by transporting rollers 11 and 12. The guide sheets 15 and 16, and also 17, confine the pieces 2 to move along the distributing paths to secondary distributing switches 7 and 8.

The first piece 2, dropping through hopper 3 and guided by transporting rollers 11 engages the left guide face of distributing switch 5 and turns the same from the position shown in FIG. 1 in counterclockwise direction to its other end position, overcoming the resistance of the dead-center arresting means 38 to 41, and turning the same away from stop 44 until the end plate 41 of tubular member 39 abuts a stop 43 on housing 4.

The respective piece 2 slides with the help of transporting rollers 2 onto the distributing path between guide sheets 16 and 17 and engages the right guide face at the lower end of the distributing switch 7, shifting the same from its illustrated left position in clockwise direction to a right-end position in which the piece of dough is aided by transporting roller 14 to move into channel 19 until resting on the closure lid 23.

The second piece of dough transported to hopper 3 and dropping through the same downward along the feeding path leading to distributing switch 5, engages the guide face on the right of the lower end of distributing switch 5, and shifts the same back in clockwise direction to the position illustrated in FIG. 1. The second piece continues its movement along the other distributing path defined by guide sheets 14 and 16, and engages the guide face at the lower end of distributing switch 8 which is shifted in clockwise direction so that the respective piece passes into channel 21 and rests on closure lid 23.

The third piece 2 fed along the feeding path through the hopper, turns distributing switch 5 in counterclockwise direction, then engages distributing switch 7, shifting the same in counterclockwise direction, and sliding into the channel 18 to rest on closure lid 23.

The fourth piece 2 shifts distributing switch 5 again in clockwise direction, moves along the respective distributing path to distributing switch 8, shifts the same in counterclockwise direction to its left end position, and is guided into channel 20 so that in all four channels 18 to 21, pieces 2 of dough rest on closure lid 23, and form a transverse row in relation to conveyor 22.

The last shifted distributing switch is distributing switch 8, which is connected with a disk 29 carrying the actuating projection 35, as shown in FIG. 3. When distributing switch 8 is shifted, projection 35 operates switch 36 and closes the same, so that electromagnet 26 is energized and opens the closure lid 23, permitting the four pieces 2 on the same to slide down onto conveyor band 22 where the four pieces form a transverse row. The operation is continued as long as single pieces 2 are fed into the hopper so that a conveyor 22 carries successive transverse rows of four pieces away from the distributing apparatus.

Since the pieces 2 move along the distributing paths to the additional distributing switches 7 and 8 at a lower speed, the arresting means shown in FIG. 3 are sufficient to assure exact operation of the distributing switches 7 and 8. However, as far as the first distributing switch 5 is concerned, the same is operated by every piece 2, and the pieces 2 moving along the feeding path to distributing switch 5, arrive at a high speed on the same, so that an arresting device as shown in FIG. 3 would not be sufficient to reliably maintain the distributing switch 5 in either end position, rebounding being possible.

The dead-center arresting means 38 to 44 shown in FIGS. 5 and 6, and adjustably mounted on shaft 6 of the distributing switch 5, reliably holds the distributing switch 5 in either end position, even if heavy pieces of dough drop on the same. Displacement out of either end position of distributing switch 5, requires not only overcoming of friction, as in the device of FIG. 3, but also overcoming of a torque exerted by the balls 40 which are in either end position eccentrically located in regard to the axis of shaft 6.

It will be understood that each of the elements described above, or two or more together, may also find a useful application in other types of an apparatus for switching objects between two distributing paths differing from the types described above.

While the invention has been illustrated and described as embodied in a mechanical distributing switch shifted by objects between two positions, and held in either position by dead-center-arresting means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Apparatus for switching objects between two paths, comprising means for feeding objects successively along a feeding path; mechanical distributing switch means located in said feeding path and being engaged and shifted by alternate objects moving along said feeding path so as to move between two end positions for guiding said alternate objects onto two distributing paths, respectively; and arresting means connected with said mechanical switch means for movement with the same between said two end positions through an intermediate dead center position, and including biasing means comprising an elongated guide member and weight means carried by said guide member for movement relative thereto between two terminal positions, said biasing means biasing said arresting means and said mechanical switch means to move to any one of said end positions when moved by an object from the respective other end position to and beyond said dead center position.

2. Apparatus as claimed in claim 1 comprising a housing having an inlet on top; wherein said feeding means include conveyor means for transporting said objects successively to said inlet means so that said objects drop through the same along said feeding path; wherein said mechanical distributing switch means is mounted in said housing below said inlet means and in said feeding path for angular movement between said end positions; and comprising two additional mechanical switches located in said two distributing paths, respectively, and each being mounted in said housing means for movement between two distributing positions, each of said additional mechanical switches being shifted by objects moving along said two distributing paths, respectively, for guiding said objects onto four paths; and means crossing said four paths for supporting successive groups of four objects.

3. Apparatus as claimed in claim 2, comprising a shaft supported on said housing for turning movement and fixedly carrying said mechanical distributing switch means in said housing, and said arresting means outside of said housing so that said shaft turns with the same between said two end positions.

4. Apparatus as claimed in claim 1, wherein said guide member is a hollow member closed at the ends thereof, and said weight means comprises at least one ball mounted in said hollow member and resting on the closed ends of the same in said end positions of said arresting means, respectively.

5. Apparatus as claimed in claim 1, wherein said guide member is a hollow member and said weight means are mounted in said hollow member for movement between said terminal positions.

6. Apparatus as claimed in claim 5 comprising a support, and a shaft mounted on said support for turning movement; wherein said mechanical switch means and said arresting means are fixedly secured to said shaft for angular movement between said end positions through said intermediate dead-center position.

7. Apparatus as claimed in claim 6 wherein said arresting means includes a clamping arm adjustably and detachably secured to said shaft; and wherein said biasing means is fixedly mounted on said clamping arm and includes movable weight means.

8. Apparatus as claimed in claim 7 wherein said hollow member is a tubular member closed at the ends thereof and mounted on said clamping arm, and wherein said movable weight means includes at least one ball movably mounted in said tubular member and resting on the closed ends of the same in said end positions, respectively, of said arresting means.

9. Apparatus as claimed in claim 5, wherein said hollow member has a cylindrical cavity; wherein said weight means include at least one ball confined in said cylindrical cavity for rolling movement between the ends of the same; and stop means engaging said hollow member in said terminal positions.

* * * * *